United States Patent [19]
Leyba et al.

[11] Patent Number: 5,911,045
[45] Date of Patent: Jun. 8, 1999

[54] METHOD AND SYSTEM FOR SHARING INFORMATION IN A VIRTUAL REALITY WORLD

[75] Inventors: Todd Leyba, Gaithersburg, Md.; David Allen Schell, Durham, N.C.

[73] Assignee: International Business Machines Corp., Armonk, N.Y.

[21] Appl. No.: 08/842,346

[22] Filed: Apr. 24, 1997

[51] Int. Cl.⁶ .................................................. G06F 13/00
[52] U.S. Cl. ................................ 395/200.34; 395/200.35
[58] Field of Search .............................. 705/35; 345/330; 395/200.49, 200.34, 200.35, 200.48; 434/350

[56] References Cited

U.S. PATENT DOCUMENTS

| | | | |
|---|---|---|---|
| 5,310,349 | 5/1994 | Daniels et al. | 434/350 |
| 5,594,859 | 1/1997 | Palmer et al. | 345/330 |
| 5,675,746 | 10/1997 | Marshall | 705/35 |
| 5,737,533 | 4/1998 | De Hond | 395/200.49 |
| 5,745,711 | 4/1998 | Kitahara et al. | 345/330 |
| 5,802,294 | 9/1998 | Ludwig et al. | 395/200.34 |

OTHER PUBLICATIONS

["What Are Virtual Reality"], IEEE Computer Graphics & Applications, Stephen R. Ellis, Jan. 1994.

["Synchronous Writing Environment : Real-time interaction in cyberspace"], Journal of Adolescent & Adult Literacy, Oct. 1996.

*Primary Examiner*—Zarni Maung
*Assistant Examiner*—Philip B. Tran
*Attorney, Agent, or Firm*—A. Bruce Clay; Timothy J. O'Sullivan

[57] ABSTRACT

A plurality of users in a virtual reality environment are registered over a network to share information. A three dimensional representation of information to be shared over the network is placed into a shared area of the virtual reality environment. The information is then transferred to all of the registered users. The registered users may be listed on a whiteboard visible to all in the environment. The information to be shared may be placed onto a conference table metaphor to indicate it is available for all registered users.

9 Claims, 5 Drawing Sheets

METHOD AND SYSTEM FOR SHARING INFORMATION IN A VIRTUAL REALITY WORLD

FIELD OF THE INVENTION

This invention relates in general to computer software, and in particular to a method and system for visually representing shared information in a virtual reality world.

BACKGROUND OF THE INVENTION

The sharing of information over a computer network is well known. Information is placed on storage accessible by a server or a mainframe. Authorized users are then able to access the information as a client through the server or the mainframe using any number of textual search methods.

As computer software moves into the realm of virtual reality, the old ways of doing things become less satisfactory. Objects, as well as people, take on the illusion of three dimensions and, thus, mere textual procedures ignore the benefits and advantages of three dimensions. Visual cues can be more robust, for example, information such as size, perspective and color can give more meaning to the data. In addition, users unskilled in computer techniques can intuitively use such visual cues. Visual cues may include, for example:

size, to include:
  an item's shape (width, height, depth),
  an item's space requirements, and
  an item's appearance (the specific design of a form, the design of a book jacket);
color and shade;
texture;
time to include:
  when it was created (and who created the item),
  when it was filed (placed in a location), and
  when it was last used or referenced;
location (may be correlated with time and size), to include:
  an item might be placed in a random stack versus in a specific location, and
  an item may be placed behind or on top of another item, depth and perspective may also play a role, i.e., an object that is overlayed by another is in back of or behind that object;
motion;
sound;
weight; and
smell.

SUMMARY OF THE INVENTION

The present invention disclosed herein comprises a method and system for sharing information in a virtual reality world which greatly reduces problems associated with prior information sharing systems. The present invention utilizes more intuitive three dimensional metaphors to assist users in understanding what is being shared.

In accordance with one aspect of the invention, a plurality of users are registered over a network to share information. A three dimensional representation of information to be shared over the network is placed into a shared area of a virtual reality environment. The information is then transferred to all of the registered users.

The registered users may be listed on a whiteboard visible to all in the environment. The information to be shared may be placed onto a conference table metaphor to indicate it is available for all registered users.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
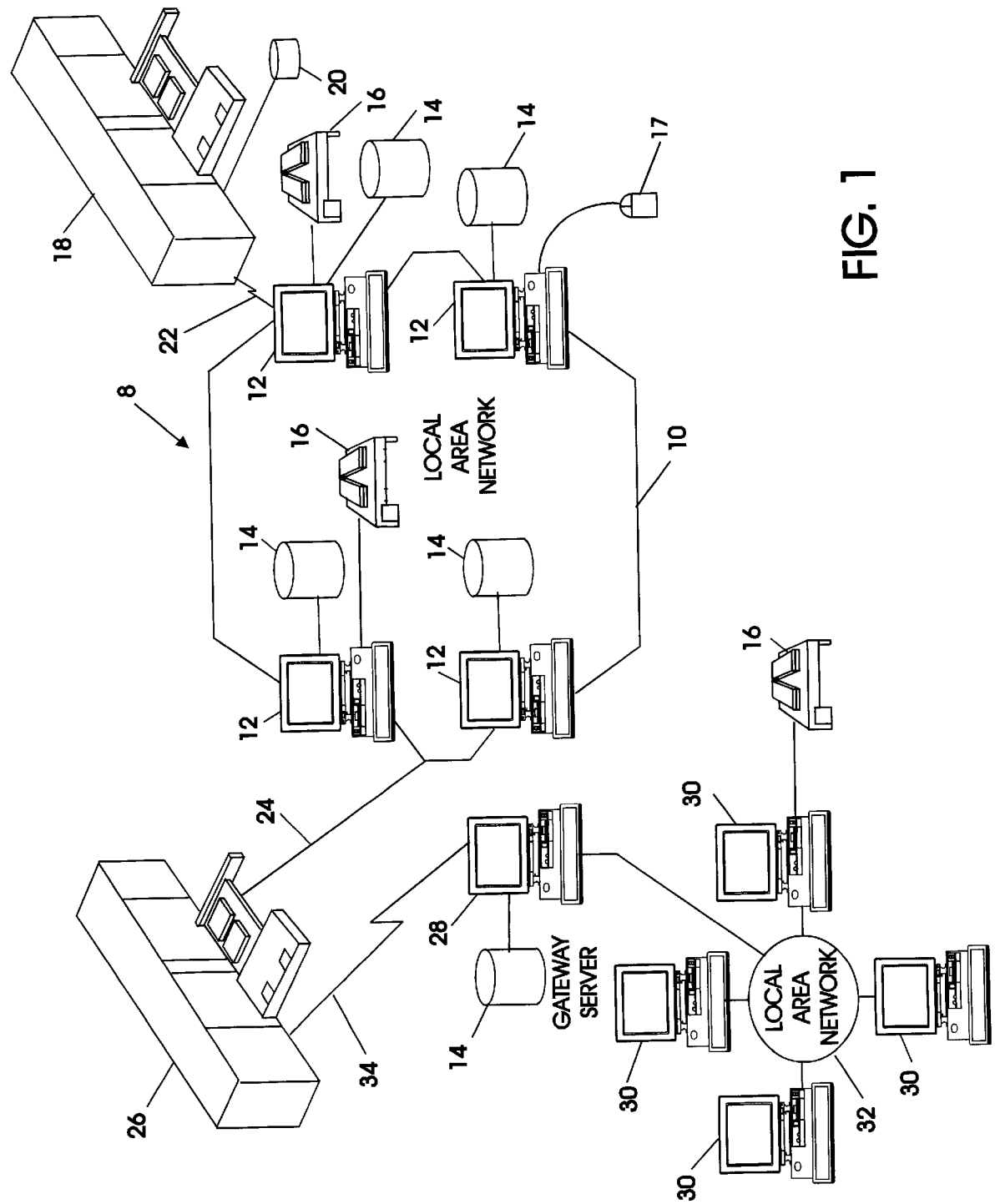
FIG. 1 is a pictorial representation of a data processing system which may be utilized to implement a method and system of the present invention.

Referring to FIG. 1, there is depicted a graphical representation of a data processing system 8, which may utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects maybe stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
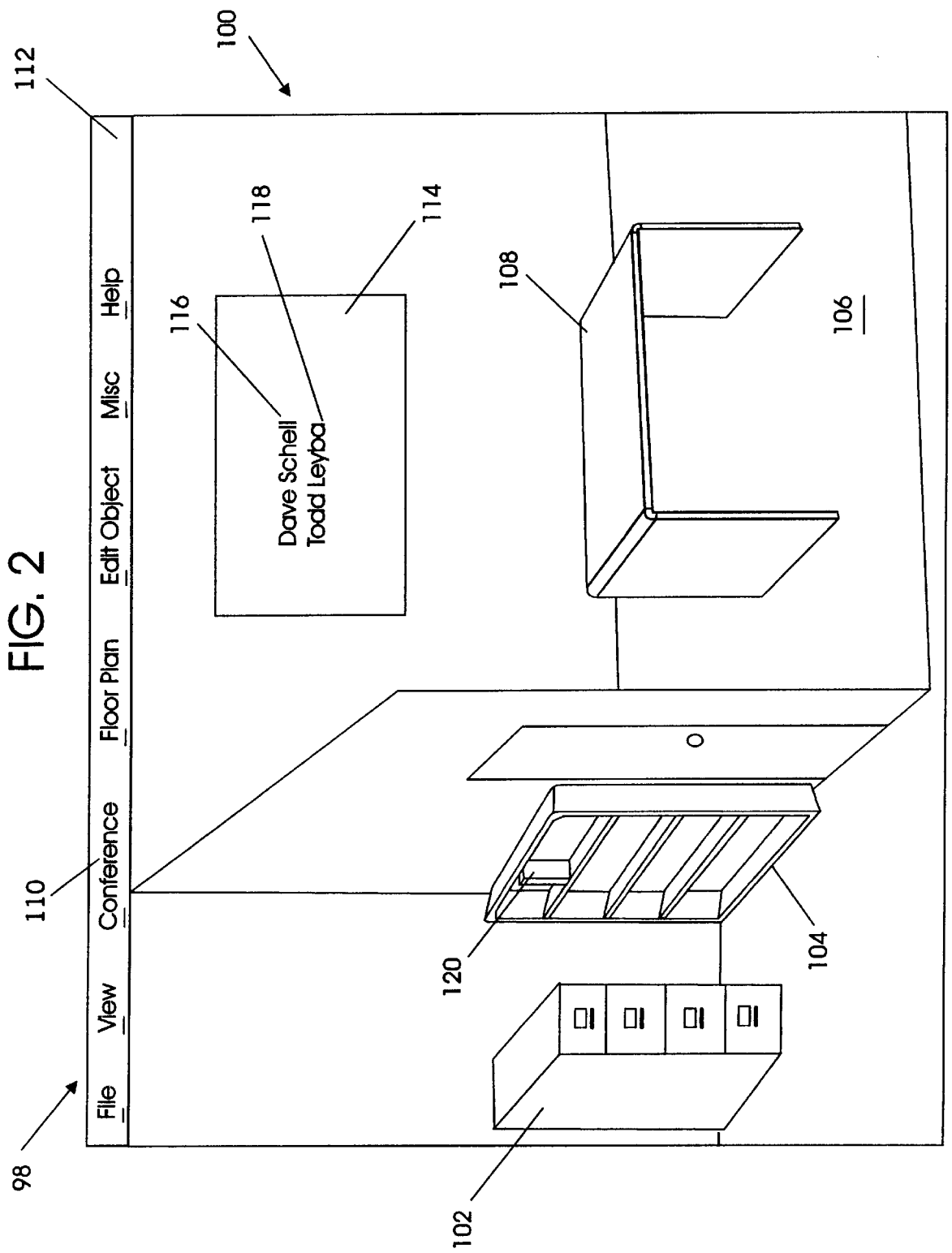
FIG. 2 is a graphical representation of a virtual reality office.

Referring to FIG. 2, a pictorial representation of one possible virtual reality environment is shown in a computer screen window 98. The environment is an office 100 which includes a storage cabinet 102, a bookcase 104, and a conference room 106. The conference room 106 includes a conference table 108, which will be subsequently described in greater detail.

Figure 3:
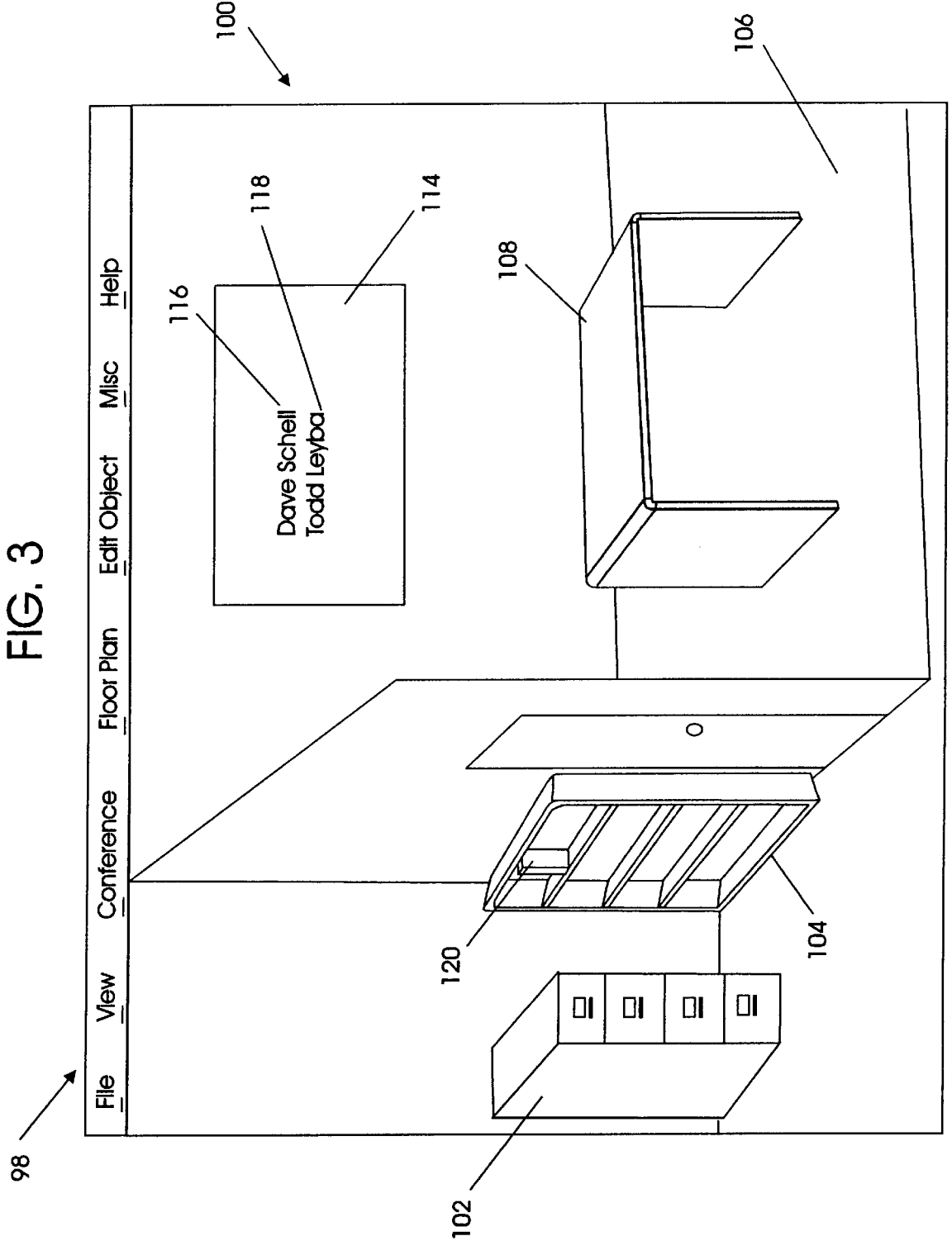
FIG. 3 is a graphical representation of a virtual reality office with conference room whiteboard in accordance with the present invention.

In order to share information, a user must first register with the environment using any appropriate method. For example, by selecting conference 110 from a menu bar 112, a user may register. Once a user has registered, their name will appear on, for example, a whiteboard 114 as shown in FIG. 3. The whiteboard 114 of FIG. 3 has two registered participants, Dave Schell 116 and Todd Leyba 118. It is to be understood that any number of users may register as determined by the systems's capacity, as determined by an administrator, or as determined by any other appropriate method.

Figure 4:
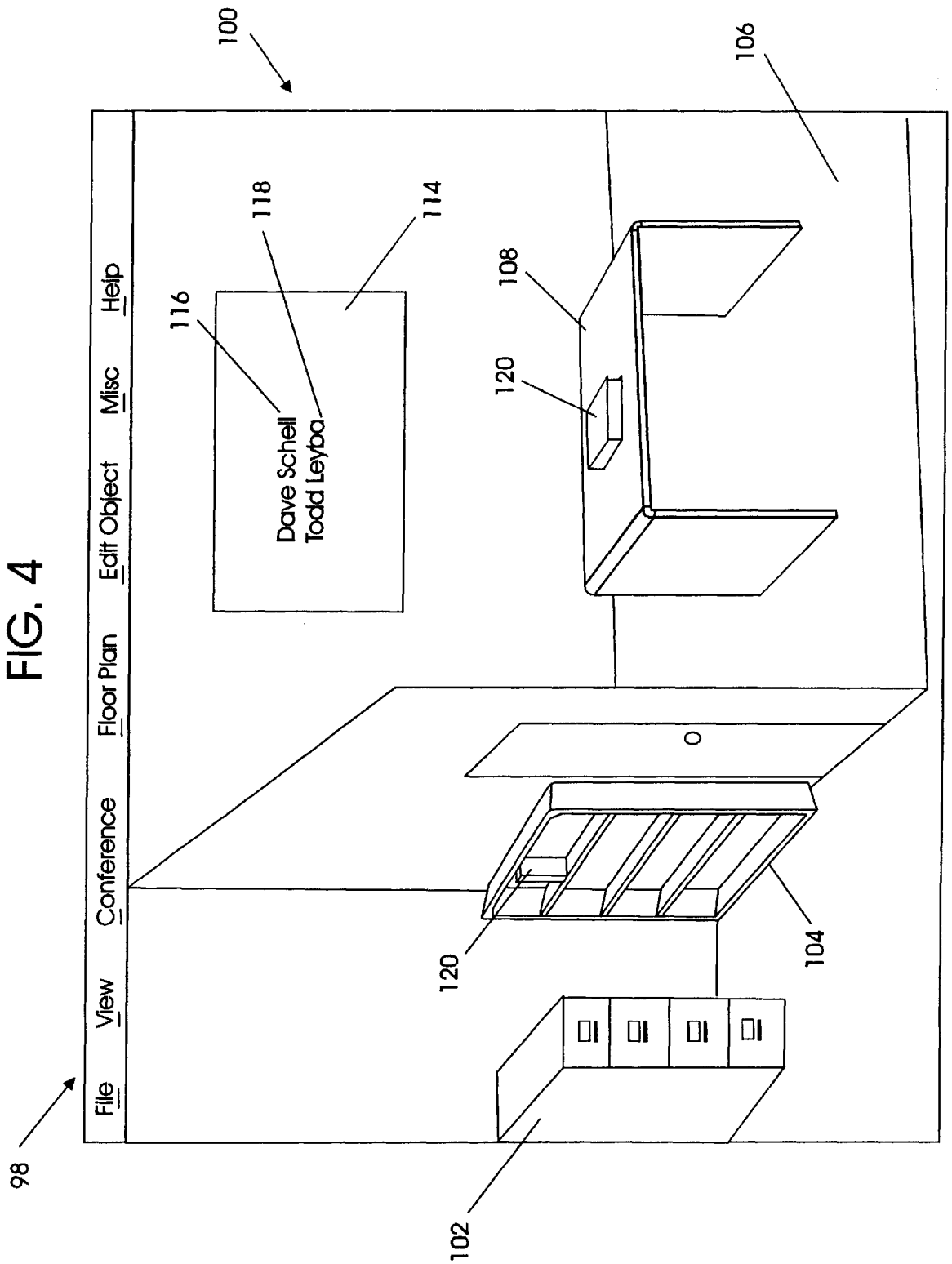
FIG. 4 is a graphical representation of a virtual reality office with conference room and a shared object in accordance with the present invention.

Referring to FIG. 4, the user has placed a book 120 from the bookcase 104 onto the conference table 108, for example, by dragging and dropping it with a mouse. Once the book 120 or any other object is placed on the conference table 108, the object is shared immediately with and shown to all other registered attendees. Thus, any registered attendee is able to use the object, in this case, the book 120, for any allowed purpose. The registered attendees are provided with an appropriate key (color codes, etc.) to allow them to identify the exact nature/title of any object on the conference table 108. It is to be understood that the use of a conference table herein is only one possible visualization of what could be more generically described as a shared area.

Figure 5:
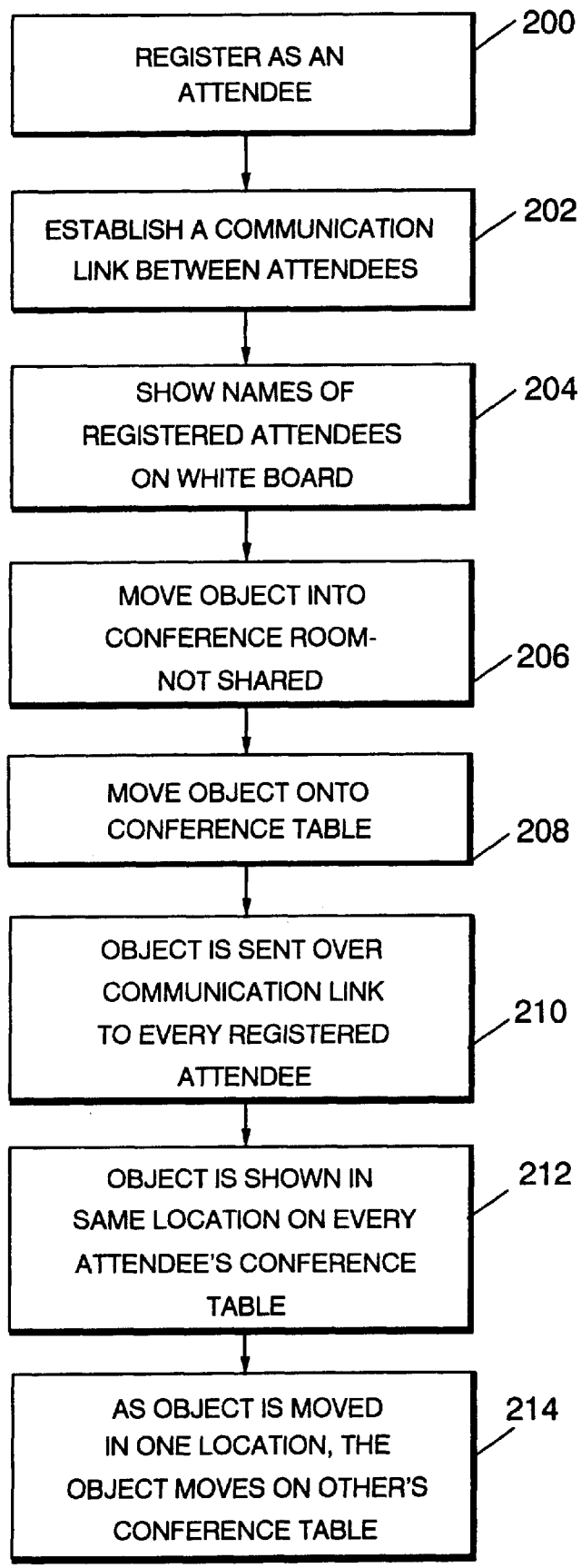
FIG. 5 is a flow chart illustrating use of the present invention.

Referring to FIG. 5, a high level flowchart illustrates the the present invention. A user first registers as an attendee to the virtual environment at block 200. A communication link is then established by any appropriate method between attendees at block 202. At block 204, the names of all registered attendees are shown on a virtual environment whiteboard. An object may be moved into the conference room at block 206 but is not shared until it is placed on the conference room table at block 208.

Once an object is placed on the conference room table, the object is sent over the communications link established in block 202 to every registered attendee at block 210. The object is shown in the same location on every attendee's conference table at block 212, and as the object is moved by any attendee, the object is seen to move on all other attendee's conference table in the same fashion at block 214.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of sharing information in a computer network three dimensional virtual reality environment, comprising the steps of:

registering a plurality of users to share information over the network;

displaying three dimensional virtual reality environments to respective registered ones of the plurality of users, wherein the three dimensional virtual reality environment includes three dimensional representations of information locally available to respective registered users;

selecting a three dimensional representation of information locally available to a first registered user for publication to other registered users;

placing the selected three dimensional representation of information locally available to the first registered user into a shared area of the environment;

transferring, responsive to the placing step, said information corresponding to the selected three dimensional representation placed into the shared area of the environment to other of said registered ones of the plurality of users in order to share said information among the registered ones of the plurality of users; and displaying the selected three dimensional representation of information placed in the shared area of the environment in the respective three dimensional virtual reality environments of the registered users to which the information was transferred.

2. The method of claim 1, wherein said step of registering further comprises:

listing all of said users on a representation of a whiteboard visible in said environment to all of said users.

3. The method of claim 1, wherein said step of placing further comprises:

placing the selected three dimensional representation of information onto a representation of a conference table.

4. A system for sharing information in a computer network three dimensional virtual reality environment, comprising:

means for registering a plurality of users to share information over the network;

means for displaying three dimensional virtual reality environments to respective registered ones of the plurality of users wherein the three dimensional virtual reality environment includes three dimensional representations of information locally available to respective registered users;

means for selecting a three dimensional representation of information locally available to a first registered user to share with other registered users;

means for placing the selected three dimensional representation of information locally available to the first registered user into a shared area of the environment;

means, responsive to the means for placing, for transferring said information corresponding to the selected three dimensional representation placed into the shared area of the environment to other of said registered ones of the plurality of users in order to share said information among the registered ones of the plurality of users; and means for displaying the selected three dimensional representation of information placed in the shared area of the environment in the respective three dimensional virtual reality environments of the registered users to which the information was transferred.

5. The system of claim 4, wherein said means for registering further comprises:

means for listing all of said users on a representation of a whiteboard visible in said environment to all of said users.

6. The system of claim 4, wherein said means for placing further comprises:

means for placing the selected three dimensional representation on to a representation of a conference table.

7. A computer program product recorded on computer readable medium for sharing information in a computer network three dimensional virtual reality environment, comprising:

computer readable means for means for registering a plurality of users to share information over the network;

computer readable means for displaying three dimensional virtual reality environments to respective registered ones of the plurality of users, wherein the three dimensional virtual reality environment includes three dimensional representations of information locally available to respective registered users;

computer readable means for selecting a three dimensional representation of information locally available to a first registered user to share with other registered users;

computer readable means for placing the selected three dimensional representation of information locally available to the first registered user into a shared area of the environment;

computer readable means, responsive to the computer readable means for placing, for transferring said information corresponding to the selected three dimensional representation placed into the shared area of the environment to other of said registered ones of the plurality of users in order to share said information among the registered ones of the plurality of users; and computer readable means for displaying the selected three dimensional representation of information placed in the shared area of the environment in the respective three dimensional virtual reality environments of the registered users to which the information was transferred.

8. The program product of claim 7, wherein said computer readable means for registering further comprises:

computer readable means for listing all of said users on a representation of a whiteboard visible in said environment to all of said users.

9. The program product of claim 7, wherein said computer readable means for placing further comprises:

computer readable means for placing the selected three dimensional representation on to a representation of a conference table.

\* \* \* \* \*